Aug. 13, 1935.  H. BENDER  2,010,841
CHLORINATION
Filed July 21, 1933

INVENTOR.
Harry Bender
BY Robert H. Eckhoff
ATTORNEY.

Patented Aug. 13, 1935

2,010,841

UNITED STATES PATENT OFFICE 2,010,841

CHLORINATION

Harry Bender, Concord, Calif., assignor to Great Western Electro - Chemical Company, San Francisco, Calif., a corporation of California Application July 21, 1933, Serial No. 681,511

48 Claims. (Cl. 260—160)

This invention relates to addition chlorination and the manufacture of chlorinated aromatic compounds, particularly addition compounds based upon hydrocarbons of the benzene series, to form aryl chlorides. Chlorinated materials of this series have been formed heretofore but in all prior processes which have come to my attention wherein chlorine per se is the chlorinating material utilized, as distinguished from chlorinating agents as sulphuryl chloride, thionyl chloride, phosphorus pentachloride, sodium hypochlorite, and chloro methyl alcohol, the chlorine has been in the gas phase and the material chlorinated has been in either the gas or liquid phase. A catalyst has also usually been employed; in chlorinating benzene to form addition products, actinic energy, as sunlight, is depended upon, the reaction proceeding very reluctantly with evolution of considerable heat.

Addition chlorination reactions of the type herein dealt with are usually strongly exothermic so that temperature control is an important factor and most chlorination processes are therefore conducted on batch process lines instead of by continuous operation. The present invention enables addition chlorination of aromatics, a subject very little treated in the literature, to be practiced on a continuous scale of operation as well as in the dark and without a catalyst. Low temperature operation is also secured, thus enabling formation of decomposition products to be prevented, and eliminating any problem of handling hydrochloric acid vapors.

It is therefore the generally broad object of the present invention to provide a chlorination process for members of the benzene series in which the catalyst may be omitted, the process conducted continuously and control over the process maintained very closely.

Another object of the present invention is to provide a simple and yet very effective refrigeration of the exothermic chlorination reactions.

Another object of the present invention is to provide for chlorination by means of liquid chlorine of aromatics to form chlorine addition compounds thereof.

The invention possesses numerous other objects and features of advantage, some of which will appear at length hereinafter wherein I have disclosed the present preferred manner of practicing chlorination of aromatics according to my invention. Variations in this practice can be made, and will be readily apparent to those skilled in the art, without departing from my invention as it is defined in the claims.

Figure 1:
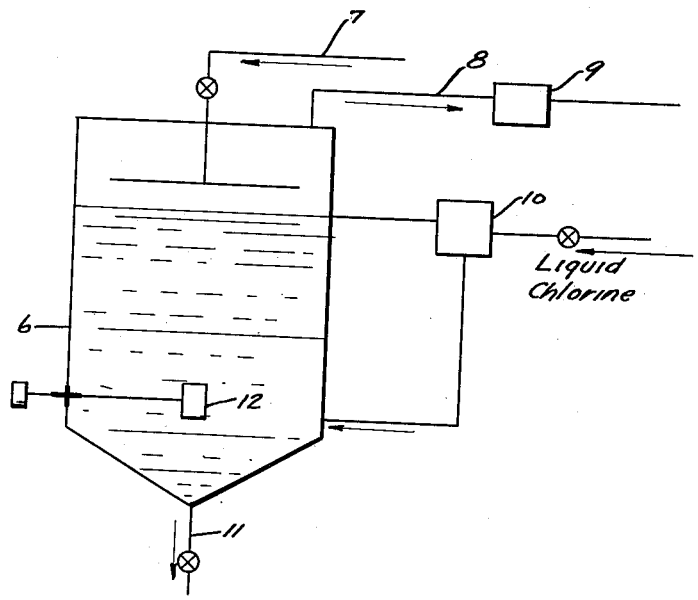
Figure 2:
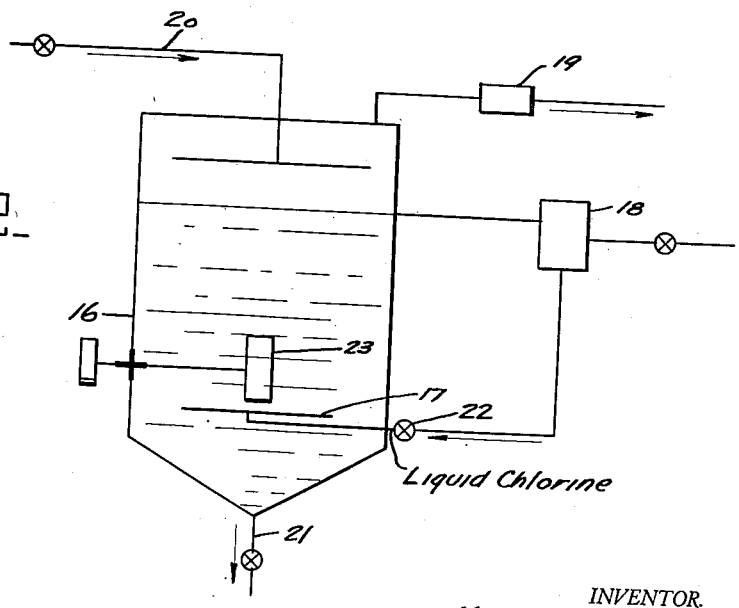

In the drawing, Figures 1 and 2 are diagrammatic representations of apparatus and flow sheets for practicing the invention.

In practicing the invention I have successfully manufactured benzene hexachloride $C_6H_6Cl_6$. The benzene has been introduced into a body of liquid chlorine, the addition of chlorine following smoothly and continuously in the liquid phase and in the absence of a catalyst such as light.

In Figure 1 is shown an apparatus and flow sheet for practicing this successfully. Into the pressure vessel 6 liquid chlorine is introduced under the control of liquid level control 10 so that a quantity of liquid chlorine is maintained therein. The liquid chlorine was maintained at about −15° C. by preserving a pressure on the vessel 6 of about 4 atmospheres. Benzene is introduced through line 7 in a continuous stream. A line 8 conducts away vaporized benzene and chlorine, pressure regulating valve 9 maintaining a predetermined pressure on the vessel 6 in conjunction with a pump and other apparatus suitable to separate and recover for use the benzene and chlorine. The total pressure, which is the sum of the vapor pressure of the reaction product, the benzene and chlorine at the temperature, determines the temperature. The benzene introduced solidifies at the low temperature but thereafter dissolves in the body of liquid chlorine. The hexachloride is slightly soluble in the liquid chlorine. However, the chlorine becomes saturated therewith and as additional hexachloride forms, crystals of it form in the vessel 6. These are of a greater density than the chlorine and therefore are collected from the bottom of vessel 6 through line 11. An agitator 12 is provided to maintain the heavy mix of benzene, chlorine and hexachloride stirred, and to prevent the crystals from forming too large a mass at any one portion of the apparatus.

In practice, during one continuous run, eighty pounds of benzene was added in a slow stream to a body of chlorine. This produced a total of two hundred ninety pounds of pure benzene hexachlorides, the yield being practically quantitative. Four benzene hexachlorides are reported in the literature all having the same molecular weight, 290.79 but melting at 112, 129, 157, and 310° C. The final product secured is a mixture of these.

In Figure 2, I have shown another form of apparatus wherein gaseous chlorine is allowed, under the control of liquid level valve 18, to pass into vessel 16 through line 17 and expansion valve 22. The expansion of the chlorine causes it to cool in vessel 16 so that the temperature is kept at some constant, low value—in one case −33° C. Temperature regulation is also controlled by pressure regulating valve 19 which determines the removal of vaporized reacting constituents as in the apparatus in Figure 1. In this apparatus, the benzene is introduced through line 20 and the benzene hexachloride crystals withdrawn through line 21. An agitator 23 is also included.

Instead of utilizing the chlorine to provide the necessary cooling, refrigeration by more usual means can be employed. However, utilizing reacting constituents, mainly the chlorine, to provide the necessary cold simplifies heat transfer problems and eliminates equipment subject to corrosion, thus simplifying the procedure.

In addition, benzene homologues as toluene, xylene, biphenyl, the phenyl methanes and phenyl acetylene, and multi-nuclear aromatics as napthalene and anthracene can be operated upon to add chlorine as can benzene derivatives and derivatives of homologues thereof such as the phenols, naphthols and diaryls as the dihydric phenols.

It is a feature of this invention that direct addition chlorination of aryls is effected in the dark and at temperatures far below the boiling point of the aryl chlorinated. In the examples given the low temperature approximated that of the boiling point of chlorine at the pressure employed, the boiling point of benzene being some 90° to 113° C. higher than that temperature at which the reaction occurred, and the benzene being a solid. By utilizing the chlorine to preserve the desired temperature, cooling of the reacting mass is simplified. Thus the reacting constituent is vaporized by the heat of reaction and removed; the vaporization requiring heat and thus keeping the temperature at a desired value. Control and variation in temperature is effected by control of the total pressure on the reaction vessel.

Because of the low temperatures employed and the use of liquid phase operation, the safety of operation is increased and the size of apparatus reduced. Vapor phase operations heretofore used are dangerous because of the flammable nature of the benzene while apparatus of large volume are necessary. In addition, the low temperature ensures a pure product; for instance the benzene hexachloride does not decompose to give trichlorbenzene, $C_6H_3Cl_3$, at the low temperatures used. This is confirmed by the absence of vapors of hydrochloric acid in the exit gases from the reaction vessels. Of course, this material can be formed if desired by heating the benzene hexachloride to liberate three chlorines as hydrochloric acid to give $C_6H_3Cl_3$.

The reaction vessel in which the chlorination is conducted is usually made of a material as glass, one not having a catalytic effect on the chlorination.

The benzene hexachlorides, and other chlorides including some presently to be described, appear to be good insecticides inasmuch as they slowly liberate hydrochloric acid vapor and are water insoluble, or nearly so.

By starting with monochlor benzene $C_6H_5Cl$, and treating with liquid chlorine in the aforedescribed manner, I have secured monochlor benzene hexachloride, $C_6H_5Cl_7$ a white solid at ordinary temperatures and having the probable structural formula of

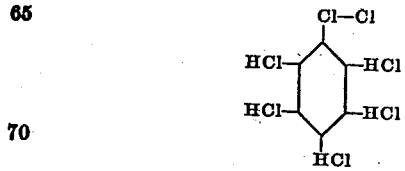

Para dichlor benzene hexachloride, $C_6H_4Cl_8$, has also been made by chlorinating para dichlor benzene $C_6H_4Cl_2$. This material is a white solid at ordinary temperatures and has the probable structural formula of

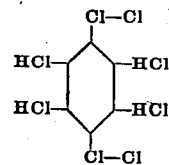

Chlorinating ortho dichlor benzene also gives a compound $C_6H_4Cl_8$.

Chlorinating toluene in the manner of the present invention produces toluene hexachlorides $C_7H_8Cl_6$. Apparently two or more isomers are produced, one being a liquid and the other a solid at ordinary temperatures.

Chlorinating xylene in the manner hereinbefore set forth results in xylol hexachloride $C_8H_{10}Cl_6$.

The invention is applicable to the following: benzene and its homologues including benzene, toluene, ortho, meta and para-xylene, ethyl benzene, hemimellithene, pseudo-cumene, mesitylene, methylethyl benzene (o, m and p), n-propyl benzene, cumene, durene, isodurene, metacymene, cymene or the like; unsaturated benzene hydrocarbons such as cinnamene and phenyl acetylene; halogen substitution products of benzene as monochlor benzene, ortho and para-dichlor benzene, bromo benzene, iodo benzene, iodo benzene dichloride, iodoxy benzene, diphenyl sodium iodide and hydroxide and mixed derivatives as chlorobromo benzenes and chloriodo benzenes or of benzene homologues as monochlor toluene, the several dichlor—and trichlortoluenes, benzyl chloride, benzyl bromide, benzal chloride, benzotrichloride and the higher homologues including xylene, mesitylene and pseudocumene; nitro compounds of benzene as mononitrobenzene, chloronitrobenzene, dinitrobenzenes, tri nitrobenzenes, chlorodinitrobenzene, phenylnitromethane and higher homologues thereof as nitrotoluenes, di- and trinitrotoluenes and trinitrotertiary butyl-m-xylene, 4-nitro xylene and nitro mesitylene, nitrocinnamenes, nitro-styrene, nitro-phenyl acetylene and phenyl nitro methane; nitroso-derivatives of the benzene hydrocarbons, as nitrosobenzene, and of derivatives and substitution products; amino compounds of benzene and its homologues including aniline, the toluidines, xylidenes, mesidine, pseudo-cumidene, and methyl-, dimethyl-, ethyl-, and diethyl-aniline, benzylamine, p-nitroaniline, the phenylenediamines, dimethyl-aniline, diethyl aniline, dephenyl amine; acetylated amines or phenylated amides as formanilide, acetanilide, thio-acetanilide, oxanilide, diacetanilide, phenyl glycocoll and compounds with the amino group in the side chain as benzyl amine derivatives or substitution products as amino benzene, aniline hydrochloride, monochlor aniline, chlor-acetanilide, and nitranilines as p-nitracetanilide; hydroxylic derivatives of benzene and its homologues, such as phenols including the monohydric phenols as phenol, the cresols, xylenols, pseudo-cumenol, carvacrol, thymol, eugenol, the dihydrics as catechol, resorcinol, quinol and orcinol, homo-catechol and quinitol, the trihydrics including such as the pyragallos, aromatic alcohols such as benzyl alcohol, phenyl-ethyl ether, phenyl methyl carbinol, aromatic aldehydes such as benzaldehyde, cinnamic aldehyde and derivatives as benzaldoxime, benzaldehyde-phenyl-hydrozane, benzylideneazime, and nitrobenzaldehydes, aromatic ketones as acetophenone and derivatives as phenacyl bromide, diphenyl-ketone, quinones as quinone, chlornil toluquinone, xyloquinone, thymoquinone, benzoquinone, quinone chlorimides, quinoneanils, and anilino-quinones, nitrogen derivatives of quinones such as chlorimides, oximes, anils as quinone chlorimide and dichlorimide, quinonediimide, quinone monoxime and quinone monanile, pseudophenols, methylene quinones or quinomethanes; aromatic acids as monobasic saturated acids including benzoic acid, and substitution products thereof as the methyl, bromo-, nitro-, and amino benzoic acids, esters as methyl and ethyl benzoate, benzyl benzoate, and other derivatives as benzoic anhydrid, benzoyl peroxide, benzamide, benzanilide, and phenyl-acetic, (o, m and p) toluic, hydrocinnamic, hydratropic, (o, m, and p) tolyl-acetic, ethyl-benzoic (o, m and p) and mesitylenic acids, monobasic unsaturated acids including cinnamic acid and derivatives as the nitro-cinnamic acids, atropic acid, phenyl-propriolic and coumaric acids; hydroxy saturated acids including salicylic, (m-p) hydroxy benzoics, anisic acid, and polyhydroxy-phenolic acids including protocatechuic acid, gallo-tannic, tannic, quinic, and thio-benzoic acids; oxidation products of the foregoing monobasic aromatic alcohol acids wherein the hydroxyl is eliminated with the side chain when the compound is oxidized, and including mandelic acid and its isomer-o-hydroxy methyl benzoic acid, phthalide, tropic acid, benzoyl-formic acid-o-nitro-benzoylformic and benzoyl-acetic acid; unsaturated monobasic phenolic acids including coumaric acids, caffeic acid, ferulic acid, umbellic acid and piperic acid; dibasic acids including phthalic acid and its anhydrid, isophthalic acid, terephthalic acid, the various hydroxy-phthalic acids including 2.5 dihydroxy-terephthalic acid, succinylo-succinic acid; polybasic acids including benzene, as: benzene s-tricarboxylic acid, trimesic acid, trimellitic acid, hemimellitic acid, and benzene tetracarboxylic acids including prehnitic acid, mellophanic acid, and pyromellitic acid.

Compounds heretofore considered with the exception of such as azobenzene, benzophenone, contain but one benzene nucleus. The invention is applicable to those materials which include compounds with two benzene nuclei directly united together, the parent substance of which is diphenyl and which is the mother substance of a series of derivatives closely resembling corresponding benzene derivatives and including benzidine, carbazole, the imide of diphenyl, the benzidine, mono and disulphonic acids as well as dihydroxy-diphenyls, diphenylene oxide, or ortho-tolidine, or dianisidine, or dimethoxy-benzidine.

The invention is applicable to members of the diphenyl methane group, wherein all compounds with two benzene nuclei are attached to a single carbon atom and whose parent substance is diphenyl methane and which has such derivatives as diphenyl methane, benzilic acid, and benzoylbenzoic acid, as well as fluorene.

The invention is applicable to members of the dibenzoyl or stilbene group, which comprises compounds containing two benzene nuclei linked together by a chain of two or more carbon atoms such as dibenzyl, stilbene, tolane, deoxybenzoin, hydrobenzoin, benzoin, and benzil.

The invention is applicable to members of the triphenyl methane group which contain compounds with three benzene nuclei attached to a single carbon atom such as triphenyl methane and its derivatives as triphenyl methane and the various derivatives thereof.

The invention is applicable to compounds wherein the benzene nuclei have been condensed, such as the napthalene group; including napthalene and its derivatives as alpha nitro napthalene, alpha naphthylamine, and beta naphthalene.

The invention is applicable to anthracene and phenanthrene, and members of these groups, including oxidation products of anthracene, in fact members which generally would be classified as carbo cyclic compounds and more particularly as members of the benzene series.

I claim:

1. In the process of chlorinating a carbocyclic organic compound, the step of adding chlorine thereto by contacting the compound with a body of liquid chlorine.

2. The improvement in the art of chlorinating a carbocyclic organic compound which comprises contacting the compound to be chlorinated with a body of chlorine under a pressure and temperature whereat said compound and said chlorine are liquids to add chlorine to said compound.

3. The improvement in the art of addition chlorination of a carbocyclic organic compound which consists in employing a body of liquid chlorine as the direct addition chlorinating agent.

4. The process of adding chlorine to a carbocyclic organic compound which includes the step of bringing into contact a body of liquid chlorine and a stream of said compound to add chlorine thereto.

5. The process of chlorinating a liquid aromatic hydrocarbon which includes the step of continuously bringing said hydrocarbon into contact with a body of liquid chlorine to add chlorine to said hydrocarbon.

6. The method of conducting an exothermic chlorination of an aromatic hydrocarbon which comprises maintaining a body of liquid chlorine, introducing the hydrocarbon into contact therewith, to add chlorine to said hydrocarbon and removing chlorine vaporized by the exothermic reaction to maintain said body of liquid chlorine and said introduced hydrocarbon at a substantially constant temperature.

7. The method of chlorinating an aromatic hydrocarbon which comprises bringing a stream of the hydrocarbon and a body of chlorine together as liquids at a temperature approximating the boiling point of chlorine to add chlorine to said hydrocarbon.

8. In the process of chlorinating a carbocyclic organic compound; the steps comprising bringing said compound into contact with a liquid body of excess chlorine whereby an exothermic addition reaction occurs, and removing heat from said reaction by vaporizing a portion of said excess chlorine.

9. In the process of chlorinating a carbocyclic organic compound, the process including an exothermic addition reaction between the reacting constituents chlorine and the compound to be chlorinated, the steps of removing heat from said exothermic reaction by maintaining said compound and a large body of liquid chlorine under a predetermined pressure, and removing vaporized compound and chlorine to preserve said pressure and thus maintain a desired temperature.

10. In the process of chlorinating a carbocyclic organic compound, the process including an exothermic addition reaction between the reacting constituents chlorine and the compound to be chlorinated, the steps of vaporizing gaseous chlorine whereby said chlorine is cooled and liquified to form a large body of liquid chlorine and then introducing the compound to be chlorinated.

11. In the process of chlorinating a carbocyclic organic compound, the process including an exothermic reaction between the reacting constituents chlorine and the compound to be chlorinated, the steps of vaporizing gaseous chlorine whereby said chlorine is cooled and liquified and then introducing the compound to be chlorinated whereby said compound is chlorinated exothermically, removing heat from said exothermic reaction by maintaining said constituents under a predetermined pressure, and removing a vaporized constituent to preserve said pressure and thus maintain a desired temperature.

12. The process of chlorinating an aromatic hydrocarbon which comprises bringing said hydrocarbon into contact with liquid chlorine in the dark.

13. The process of forming benzene hexachloride which comprises bringing benzene into contact with a body of chlorine at a temperature and pressure whereat said chlorine is a liquid.

14. The process which comprises bringing toluene into contact with liquid chlorine to add chlorine to said toluene.

15. The process which comprises bringing ortho dichlorbenzene into contact with liquid chlorine to add chlorine to said ortho dichlorbenzene.

16. The process of forming addition chlorination products of a chlorinated benzene which comprises contacting said chlorinated benzene with liquid chlorine to add chlorine to said chlorinated benzene.

17. The process comprising contacting a carbocyclic organic compound with liquid chlorine in the dark.

18. The process comprising contacting a carbo-cyclic organic compound with liquid chlorine in the dark and in the absence of a chlorine carrier.

19. The process comprising contacting a carbocyclic organic compound with liquid chlorine in the dark and in the absence of a catalyst.

20. The process comprising contacting a carbo-cyclic organic compound with liquid chlorine in the dark and in the absence of a chlorine carrier or catalyst.

21. The process comprising adding chlorine to a liquid carbo-cyclic organic compound by contacting said liquid with liquid chlorine in excess of that required to chlorinate that amount of compound present at any instant.

22. The process comprising maintaining a body of liquid chlorine at a low temperature and dissolving therein a carbo-cyclic organic compound.

23. The process comprising forming a chlorine addition product in a body of liquid chlorine, and continuing said formation until solubility of said product in said body is passed and said product precipitates.

24. The process comprising chlorinating a material in a body of liquid chlorine and continuing said chlorination until solubility of the chlorinated material is exceeded by the concentration of the chlorinated material and said chlorinated material precipitates.

25. The process comprising adding a material continually to a maintained body of liquid chlorine to chlorinate said material and precipitate a chlorinated product.

26. The process comprising adding a carbocyclic organic material continually to a maintained body of liquid chlorine to chlorinate said material and precipitate a chlorinated product.

27. The process comprising adding benzene continually to a maintained body of liquid chlorine to chlorinate said benzene and precipitate as a chlorinated product benzene hexachloride.

28. The process comprising adding a nuclear chlorinated benzene to a maintained body of liquid chlorine to add further chlorine to said benzene and precipitate the chlorinated addition product.

29. The improvement in the art of addition chlorination which comprises adding a liquid carbocyclic compound continuously to a maintained body of liquid chlorine in the dark.

30. The improvement in the art of addition chlorination which comprises adding a liquid carbocyclic compound continuously to a maintained body of liquid chlorine.

31. The improvement in the art of addition chlorination which comprises adding a carbocyclic organic compound to a body of liquid chlorine maintained at a temperature and pressure whereat said compound solidifies.

32. The improvement in the art of addition chlorination which comprises adding a carbocyclic organic compound to a body of liquid chlorine maintained at a temperature and pressure whereat said compound solidifies and an addition product of said compound and chlorine crystallizes out.

33. The improvement in the art of addition chlorination which comprises continually bringing a liquid carbocyclic compound into contact with a maintained body of liquid chlorine in excess of that required to react with the compound present at any one time, and continually removing a crystalline addition chlorination product of said compound.

34. The product secured by chlorinating liquid benzene with excess liquid chlorine in the dark and comprising a mixture of benzene hexachlorides.

35. The improvement in the art of addition chlorination which comprises adding a carbocyclic organic compound to a body of liquid chlorine maintained at a temperature and pressure whereat said compound solidifies and continually removing gaseous chlorine and compound to maintain said temperature.

36. The improvement in the art of addition chlorination which comprises continually discharging a liquid carbocyclic organic compound into contact with a body of liquid chlorine, maintaining said body of liquid chlorine substantially intact as to volume, and continually exhausting vaporized chlorine and compound to maintain said body of chlorine at a predetermined temperature.

37. A process comprising adding chlorine to a carbo-cyclic compound by an exothermic addition reaction conducted by dissolving said compound in a maintained body of liquid chlorine wherein the concentration of the addition reaction product exceeds its solubility and said product precipitates.

38. A process comprising adding chlorine to a carbo-cyclic compound by an exothermic addition reaction conducted by dissolving said compound in a maintained body of liquid chlorine continually subjected to vaporization to remove heat of said exothermic reaction.

39. Chlorinating a carbocyclic compound, having a previous nuclear substitution, in a body of liquid chlorine to add chlorine to the nucleus and avoid further nuclear substitution.

40. Chlorinating in the nucleus a carbocyclic compound, having a side chain, in a body of liquid chlorine to add chlorine to said nucleus and avoid side chain chlorination.

41. Chlorinating a carbocyclic compound, having a previous nuclear substitution, with a body of liquid chlorine in excess of that required to chlorinate said compound, to add chlorine to the nucleus and avoid further nuclear substitution.

42. Chlorinating in the nucleus a carbocyclic compound having a side chain, with a body of liquid chlorine in excess of that required to chlorinate said compound, to add chlorine to said nucleus and avoid side chain chlorination.

43. Chlorinating a carbocyclic compound, having a previous nuclear substitution, in a body of liquid chlorine to add chlorine to the nucleus and avoid further nuclear substitution, and continuing to add said compound to said body of chlorine to continue formation of addition clorinated compound and cause said addition chlorinated compound to precipitate from said body of chlorine.

44. Chlorinating in the nucleus a carbocyclic compound, having a side chain, in a body of liquid chlorine to add chlorine to said nucleus and avoid side chain chlorination, and continuing to add said compound to said body of chlorine to continue formation of addition chlorinated compound and cause said addition chlorinated compound to precipitate from said body of chlorine.

45. A chlorination addition process comprising bringing into contact a carbocyclic compound and a body of liquid chlorine, vaporizing from said body chlorine to maintain a predetermined temperature in said body, and removing from said body a precipitated chlorine addition product of said compound.

46. In an addition chlorination process, chlorinating in a body of liquid chlorine saturated with the material to be chlorinated and the chlorinated product while maintaining said body at a substantially constant temperature by vaporizing chlorine from said body.

47. Adding chlorine to a carbocyclic compound by introducing said compound into a cold body of liquid chlorine saturated with the final addition product of chlorine and said compound.

48. Adding chlorine to a carbocyclic compound by introducing said compound into a cold body of liquid chlorine saturated with said compound.

HARRY BENDER.